Inventor
Edgar R. Holmes.

June 21, 1932. E. R. HOLMES 1,863,985
AUTOMATIC TRANSMISSION
Filed Jan. 2, 1931  3 Sheets-Sheet 3
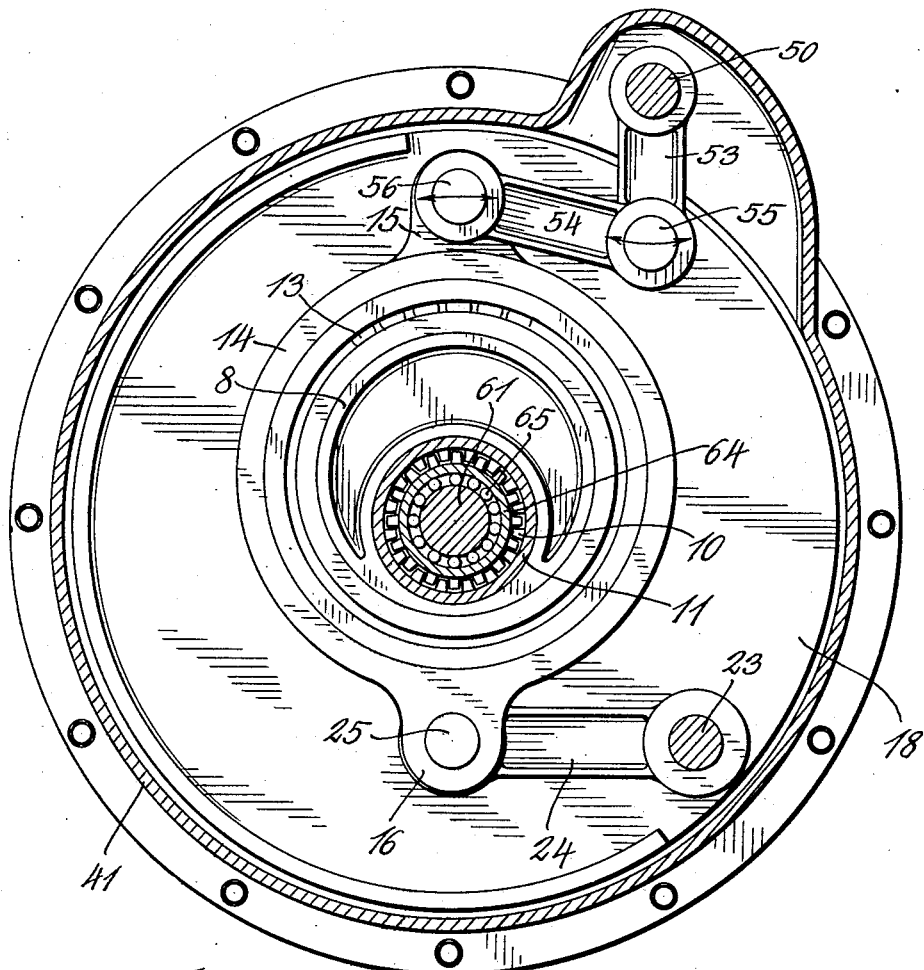
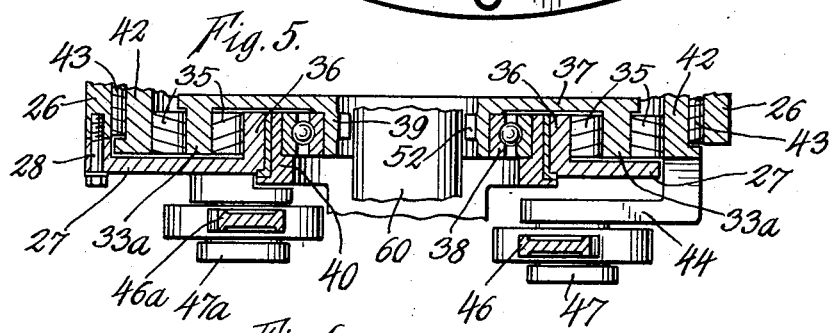
Inventor
Edgar R. Holmes.
By A. J. O'Brien
Attorney Patented June 21, 1932

1,863,985

UNITED STATES PATENT OFFICE

EDGAR R. HOLMES, OF DENVER, COLORADO, ASSIGNOR OF ONE-HALF TO HORACE M. LITTLE, OF DENVER, COLORADO

AUTOMATIC TRANSMISSION

Application filed January 2, 1931. Serial No. 506,208.

This invention relates to improvements in transmissions of the type employed in connection with automobiles for use in starting the automobile and for use in traveling up steep grades where a gear reduction is necessary.

The ordinary automobile is provided with a transmission device comprising several movable gears that can be shifted so as to alter the gear ratio between the driving and the driven shaft and these gears are controlled by means of a gear shift lever that is within easy reach of the driver and by means of which three or more shifts in the gear ratio can be quite readily effected so as to facilitate starting and enable the car to travel up steep grades, as above initimated.

With the usual transmission gears, great care must be exercised in shifting so as to prevent the stripping of the gears, and, besides this, during the intervals when the gears are shifted, the engine is entirely disconnected from the driving wheels of the automobile and therefore if the gears are shifted in going up a steep grade, the car will sometimes come to a stop before the next gears are engaged which is dangerous, as well as inconvenient.

It is the object of this invention to produce a transmission device that can be substituted for the ordinary transmission gears, and which shall function automatically to bring the speed of the driven shaft up to approximately the speed of the drive shaft without making it necessary to shift gears and which shall be provided with means for making a direct connection between the drive and the driven shaft after the two have been brought to the same speed of rotation.

This invention, briefly described, consists of a device having a heavy inertia member or fly wheel rotatably carried by the drive shaft and having also an eccentric that can be connected with the drive shaft, so that it will be rotated by the drive shaft or which can be disconnected from the drive shaft so as to permit free relative rotation between the eccentric and the drive shaft. Carried by the driven shaft are two ratchet mechanisms that are operated by means of two connecting rods which are connected to the ends of two spaced crank arms secured to a rocker shaft that is oscillated about its axis by means of the eccentric. Secured to the eccentric is an elongated eccentric strap having oppositely located bearings, the lower of which is connected with the inertia member by means of a link and the upper of which is connected to a crank arm secured to the rock shaft. The inertia member serves as a yielding abutment for one end of the eccentric strap and tends to hold the latter against movement, thereby exerting a force on the rocker shaft which tends to oscillate the latter for the purpose of oscillating the ratchet devices, in opposite directions. Means is provided for connecting either one of the ratchet devices to the driven shaft so that the latter may be rotated either in the same direction as the drive shaft, or in the opposite direction. After the two shafts have been brought into substantially the same speed of rotation, the eccentric as well as the two ratchet mechanisms are entirely disconnected from their respective shafts, and the two shafts directly coupled so that they will rotate at the same speed.

Having thus briefly described the invention, the same will now be described in detail, and for this purpose reference will be had to the accompanying drawings in which the preferred embodiment of the invention has been illustrated, and in which:

Fig. 5 is a section taken on line 5—5, Fig. 1, and shows the eccentric and the parts associated therewith; and Fig. 6 is a section taken on line 6—6, Fig. 3.

Figure 3:
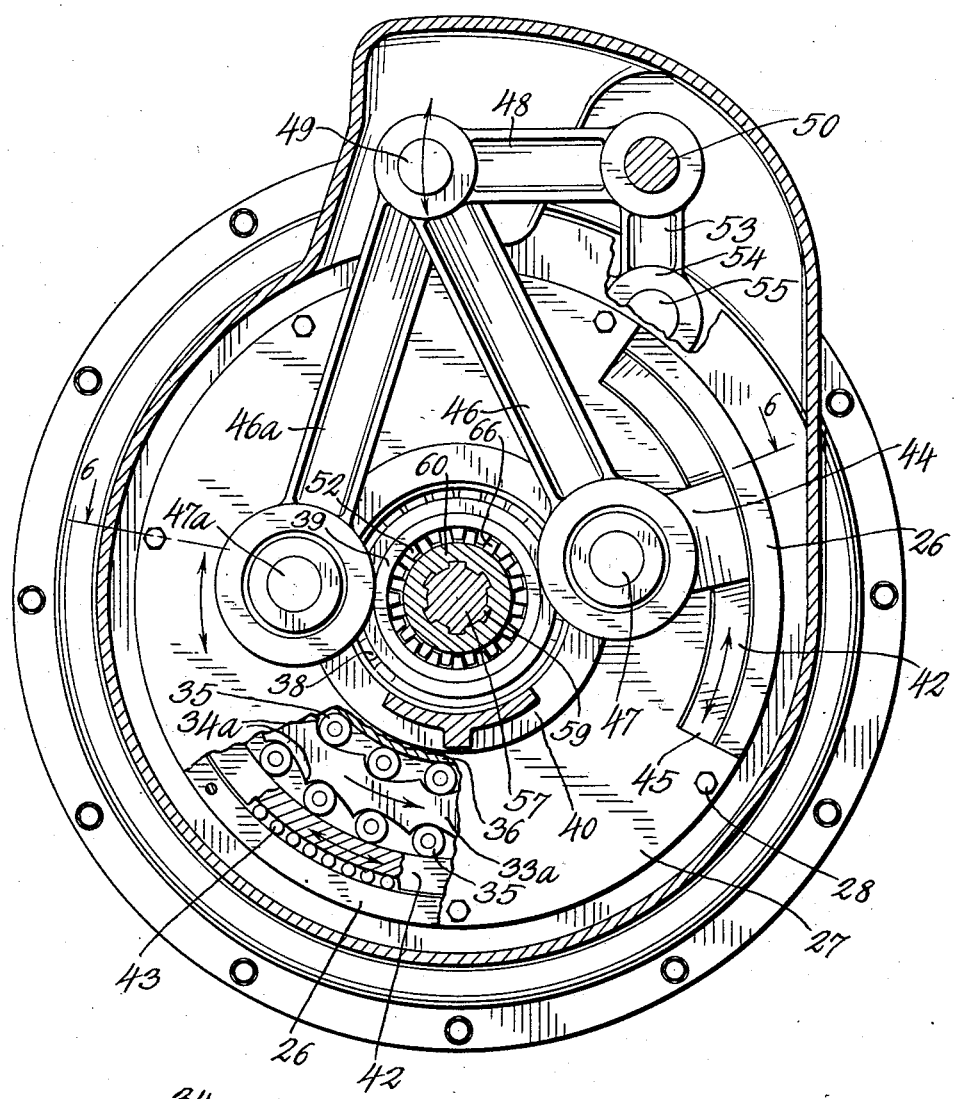
Fig. 3 is a section taken on line 3—3, Fig. 1; portions being broken away to better disclose the construction.
Figure 4:
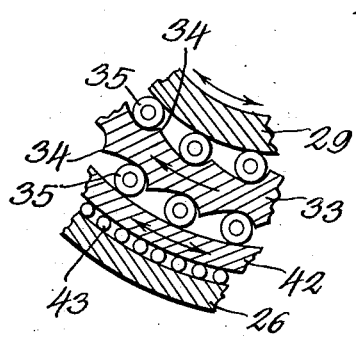
Fig. 4 is a section taken on line 4—4, Fig. 1, and shows the reverse ratchet mechanism.

In the drawings reference numeral 1 represents the drive shaft which may be the crank shaft of an internal combustion engine, and reference numeral 2 designates the ordinary fly wheel which is secured to the flange 3 of the drive shaft by means of bolts 4. A tubular sleeve 5 is secured to the side of the fly wheel opposite from that to which the flange 3 is secured and this sleeve is provided with internal teeth 6. Carried by the sleeve 5 is a ball bearing 7 to the outer ball race of which the eccentric 8 is secured by means of the annular flange 9. The eccentric is provided with a row of internal teeth 10 that are located adjacent the teeth 6 of the sleeve. Extending outwardly from the eccentric is a hub 11 to the cylindrical surface of which a ball bearing 11a is secured. An eccentric plate 12 is secured to the hub 11 and projects beyond the eccentric surface and serves to hold the ball bearing 13 in place on the eccentric. Secured to the outside ball race of the ball bearing 13 is an eccentric strap 14. This eccentric strap is provided with diametrically located bearing lugs 15 and 16. Secured to the outer surface of flange 9 is a ball bearing 17, to the outer ball race of which a fly wheel or inertia member 18 is connected. Secured to the outer ball race of bearing 11a is a ratchet member comprising a circular disk 19 having a flange 20 that extends over the outer ball race and holds the member 19 in concentric relation with the drive shaft. Secured to the outer surface to flange 20 is a ball bearing 21 to the outer ball race of which the inertia member 22 is secured. The two inertia members 18 and 22 are substantially identical in size and shape, with the exception that one is a right and the other is a left. The two inertia members are connected by means of a pin 23 that serves as a pivot for one end of the link 24 whose other end is connected to the bearing lugs 16 by means of a pivot pin 25 (Fig. 5). The outer edge of plate 19 terminates in a cylindrical flange 26 that extends rearwardly some distance and to the edge of which the annular plate 27 is secured by means of cap screws 28. Plate 19 is provided with a hub 29 that extends in the opposite direction from the hub 20 and secured to the inner surface of this hub is a ball bearing 30. The inner ball race of bearing 30 is secured to a hub 31 that forms part of a ratchet wheel 32 having a forwardly extending flange 33 that is provided on its two opposite sides with ratchet teeth 34 in the manner shown in Fig. 4. The outer surface of hub 21 is cylindrical and spaced from the inner surface of flange 33 a short distance. Rollers 35 are located in the ratchet teeth and are free to rotate in such a way that they will pinch and form a driving connection between parts 21 and 33 when the former moves in a clockwise direction, Fig. 4, but which will permit free relative movement of the parts in the opposite direction. The annular plate 27 has a rearwardly extending flange 36. A ratchet member 37 which is a duplicate of ratchet member 32 is mounted for rotation on a ball bearing 38 which is located between the hub 39 and the inner surface of the circular flange 40 that forms part of the casing 41. A cylindrical ratchet member 42 is located between the disk 19 and the annular plate 27, and is separated from the inner surface of flange 26 by means of a plurality of rollers 43. Member 42 is provided with an arm 44 that extends outwardly through an opening 45 in plate 27. This arm extends inwardly as shown in Fig. 3 and is connected with the lower end of the connecting rod 46 by means of a pivot pin 47. Another connecting rod 46a is connected with the annular disk 27 by means of a pivot pin 47a. The upper ends of these two connecting rods are located between the crank arms 48 and connected to the latter by means of a pivot pin 49. Crank arms 48 are secured to the rocker shaft 50, which is journalled in the casing 41. The flange 33a of ratchet member 37 is provided on opposite sides with ratchet teeth 34a in the manner shown in Fig. 3. Rollers 35 are located in the ratchet teeth between the latter and the adjacent surfaces of members 36 and 42. The ratchet teeth in members 33 and 33a are inclined in opposite directions as can be clearly shown from Figs. 3 and 4. The ratchet members 32 and 37 are provided on the inner surfaces of hubs 31 and 39, respectively, with internal clutch teeth 51 and 52. The front end of rocker shaft 50 has connected with it a crank arm 53 that extends substantially at right angles to crank arms 48 and to the free end of which the link 54 is connected by means of a pin 55. The other end of link 54 is connected with the bearing lug 15 by means of a pin 56. It will therefore be seen that whenever the eccentric strap is rocked, it will oscillate shaft 50 which in turn will move the crank arms 48 and the connecting rods 46 and 46a upwardly and downwardly, thereby oscillating the members 42 and 19 and 27 simultaneously in opposite directions, and this in turn imparts to members 33 and 33a rotation in opposite directions due to the action of the ratchet connection between these members and the oscillating member. The driven shaft has been designated by reference numeral 57 and is journaled in a ball bearing 58 carried by the housing. The inner end of shaft 57 is provided with splines 59 and has secured to it a sleeve 60. This sleeve is provided with splines on its inner surface that cooperate with those on the shaft and is freely slidable on the inner end of the driven shaft. Secured to the front or inner end of sleeve 60 is a short piece of shaft 61. The outer or rear end of this shaft has splines that engage the splines in the sleeve and is secured to the latter by a pressed fit so that it will have neither rotary nor longitudinal movement with respect to the sleeve. Shaft 61 has its front end provided with short splines 62 and secured to this end of the shaft is a clutch member 63. Located between the clutch member 63 and the sleeve 60 is an elongated clutch member 64 that is separated from the shaft by means of rollers 65. The clutch member 64 is freely rotatable on the shaft and when in the position shown in the drawings, the teeth of this clutch member engage with the internal teeth 6 and 10. The sleeve 60 is provided with external teeth 66 which when the parts are in neutral position are located between the clutch teeth 51 and 52, but which can be moved into engagement with either of these last mentioned teeth. When the teeth 66 mesh with clutch teeth 51 the driven shaft is rotated so as to move the automobile backwardly and when they are in engagement clutch teeth 52 the automobile moves forwardly, and this therefore constitutes the reverse gear mechanism. When the handle 67 is moved forwardly until the teeth 66 are moved to the rear of clutch teeth 52 the teeth 63 will then be moved into engagement with the internal teeth 6 which forms the direct drive connection between shaft 1 and shaft 57, and at the same time disconnects the eccentric and the two ratchet wheels so that this part of the mechanism can remain stationary while the automobile is running in high gear.

Figures 1, 2:
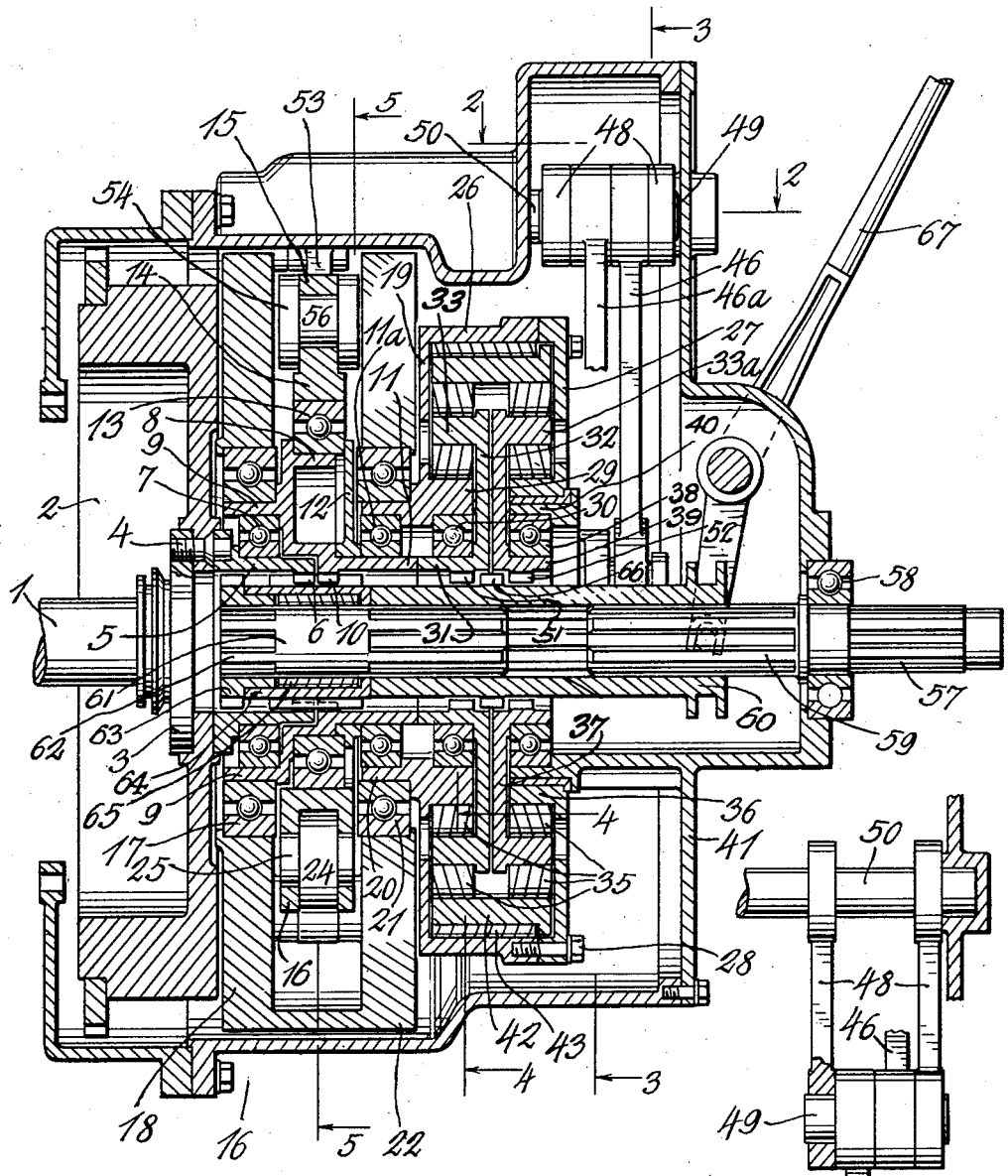
Fig. 1 is a longitudinal vertical section through the transmission device.
Fig. 2 is a section taken on line 2—2, Fig. 1.

Let us now consider a case in which the parts are in the position shown in Fig. 1. In this position the sleeve 5 and the eccentric 8 are interconnected with clutch member 64 in such a way that when shaft 1 rotates, the fly wheel 2 and the eccentric 8 will also rotate at the same speed. When the eccentric rotates, it will move the eccentric strap and this motion is resisted by the two links 24 and 54. Unless these two links can move or unless one of them can move, the eccentric cannot rotate. Link 24 is connected with the two inertia members as above described, while link 54 is connected with the rocker shaft in such a way that the latter will be oscillated when the eccentric turns. With the parts in neutral position and the engine running, the eccentric will rotate and oscillate the rocker shaft while the inertia members will remain comparatively stationary, due to the fact that there is very little resistance offered by the rocker shaft. If we now move handle 67 forwardly so as to bring the teeth 66 into engagement with the teeth 52, then when the rocker shaft moves and rotates the ratchet device 37, the latter will rotate the driven shaft and move the automobile forwardly. Since ratchet member 37 is rotated in the same direction, regardless of the direction that the crank 48 is moving, it will impart a continuous rotation to the driven shaft. When the machine is started from a standstill, the inertia of the automobile is large and therefore the rocker shaft is not readily oscillated and in order to permit the eccentric to turn, the inertia members 18 and 22 must oscillate. When the automobile begins to move, the amplitude of the oscillations of the inertia members will decrease, while the amplitude of the oscillations of the rocker shaft will increase until at last the inertia members will remain substantially stationary, thereby imparting to the rocker shaft the maximum oscillations, which in turn gives to the driven shaft the maximum speed. After the parts have assumed a condition in which the inertia members are substantially stationary, handle 67 is moved forwardly so as to disconnect the teeth 66 from the teeth 52 and at the same time disconnect the clutch member 64 from the internal teeth 6 and 10. The speed of the engine can be decreased slightly at this point and the handle 67 moved forwardly until teeth 63 engage teeth 6, whereupon a direct drive connection is established between shaft 1 and shaft 57. After the direct drive connection has been established, the eccentric will not be caused to rotate and therefore the inertia members, the rocker shaft and the ratchets remain stationary as long as this direct drive connection is maintained.

From the above description it will be seen that I have produced a mechanism in which the prime mover or engine is connected to the driven shaft by a transmission mechanism, comprising ratchets and inertia members so interrelated to each other that the drive shaft can rotate at full speed, while the driven shaft remains stationary and which without altering the speed of the drive shaft, will gradually increase the speed of the driven shaft to such a point that the two shafts can be directly connected, whereupon the transmission mechanism becomes inoperative and it remains in this condition until the parts have been moved so as to bring the teeth 64 into mesh with the teeth 10. When the teeth 66 are moved into mesh with teeth 51, shaft 57 is rotated in a direction to reverse the motion of the automobile as above described.

It is evident that in order to interconnect clutch member 63 with internal teeth 6, the driving and the driven shaft should rotate substantially at the same speed, and this can be effected by permitting the engine to slow down during the period when this gear shift is accomplished.

If it should be found desirable to substitute for the clutch teeth 63 a multiple disk clutch, this can be easily accomplished by a very obvious modification of the apparatus shown, and if a multiple disk clutch is substituted, there will be no necessity of obtaining synchronous rotation of the two shafts before they are interconnected, as such clutches permit relative rotation to take place for a short time.

Although the device has been explained and illustrated in connection with two inertia members 18 and 22, it is evident that a single inertia member can be used as the weight of the inertia member can be increased or decreased to get the desired resistance. Instead of employing inertia members as shown, it is also possible to connect the link 24 with some dash pot arrangement that will afford the necessary resistance, and therefore form a satisfactory substitute for the inertia members.

Having described the invention what is claimed as new is:

1. An automobile transmission comprising, in combination, a drive shaft, a driven shaft, a ratchet wheel nonrotatably connected with the driven shaft, an eccentric secured to the drive shaft so as to be rotated thereby, a strap enclosing the eccentric, an inertia member rotatably supported on the drive shaft, a link connecting one end of the strap with the inertia member and means interposed between the other end of the strap and the ratchet wheel for rotating the latter in one direction when the said other end of the eccentric is oscillated.

2. An automobile transmission comprising, in combination, a drive shaft, a driven shaft, a ratchet wheel nonrotatably connected with the driven shaft, an eccentric secured to the drive shaft so as to be rotated thereby, a strap enclosing the eccentric, an inertia member rotatably supported on the drive shaft, a link connecting one end of the strap with the inertia member, a shaft extending parallel with the axis of the drive and driven shafts, and mounted for oscillation, a crank arm secured to one end of the shaft, a link connected at one end to the end of the crank arm and at the other end to the eccentric strap, the other end of the oscillatable shaft having a crank arm and means connected with the last named crank arm for turning the ratchet wheel in the same direction while the oscillating shaft moves in either direction.

3. An automobile transmission comprising, in combination, a drive shaft, a driven shaft, a ratchet wheel nonrotatably connected with the driven shaft, an eccentric secured to the drive shaft so as to be rotated thereby, a strap enclosing the eccentric, an inertia member rotatably supported on the drive shaft, a link connecting one end of the strap with the inertia member, means interposed between the other end of the strap and the ratchet wheel for rotating the latter in one direction when the said other end of the eccentric is oscillated, and means for simultaneously forming a postive drive connection between the drive and the driven shaft and for disconnecting the eccentric and the ratchet wheel from the drive and the driven shaft, whereby the drive and driven shafts will rotate at the same speed and the ratchet mechanism will be inoperative.

4. An automatic transmission, comprising, in combination, a drive and a driven shaft in axial alignment, an eccentric encircling the drive shaft, two ratchet wheels carried by the drive shaft, means for nonrotatably connecting the eccentric to the drive shaft and either one of the ratchet wheels to the driven shaft, and for disconnecting the eccentric and the ratchet wheels from the shafts and simultaneously therewith forming a direct drive connection between the two shafts, an eccentric strap associated with the eccentric, a yielding retarding device, one end of the strap being connected to the yieldable retarding device and means interposed between the other end of the eccentric strap and the ratchet wheels for rotating the latter in opposite directions when the eccentric strap oscillates.

5. An automatic transmission comprising, in combination, a drive and a driven shaft in axial alignment, an eccentric encircling the drive shaft, two ratchet wheels carried by the driven shaft, means for nonrotatably connecting the eccentric to the drive shaft and either one of the ratchet wheels to the driven shaft and for disconnecting the eccentric and the ratchet wheels from the shafts and simultaneously therewith forming a direct drive connection between the two shafts, an elongated eccentric strap surrounding the eccentric, an inertia member mounted for oscillation about the axis of the drive shaft. a link connecting one end of the eccentric strap with the inertia member, a rocker shaft extending parallel with the common axis of the drive and the driven shafts, a crank secured to one end of the rocker shaft, a link connecting the eccentric strap with the free end of the crank, two ratchet members encircling the driven shaft, and operating means associated with each ratchet member.

In testimony whereof I affix my signature.

EDGAR R. HOLMES.